UNITED STATES PATENT OFFICE 2,507,755

PREPARATION OF ALKYL ANILINES

James H. Boyd, Bronxville, N. Y., assignor to Phillips Petroleum Company, a corporation of Delaware No Drawing. Application December 9, 1946, Serial No. 715,129

10 Claims. (Cl. 260—578)

This invention relates to the preparation of aromatic organic compounds. In a particular aspect it relates to the preparation of ar-alkyl anilines from the reaction of aniline with alkyl phenols.

The alkyl anilines of this invention are useful in medicine as antiseptics, in the dye and rubber industries for organic synthesis, in the manufacture of resin, varnishes, Bakelite, and similar products, and as intermediate compounds in the production of the above compounds. Alkyl anilines and products made from them have been found to be useful as anti-oxidants in the preparation of synthetic rubbers. They also have been found beneficial in other practice such as improvement of discoloration, fatigue, cracking, and other aspects of the rubber industry. The activity of the para substituted compounds is generally somewhat higher in these respects than that of the corresponding ortho and meta compounds and, since the products of the present invention include a high proportion of para substituted anilines, the process is especially desirable in preparing such compounds. The preparation of these compounds has been described in the literature by the reduction of alkylated nitrobenzenes to the corresponding ar-alkyl anilines in the presence of concentrated sulfuric acid or strong (70 per cent) alkalis, such as KOH; by the reaction between the corresponding alcohol and aniline in the presence of the sulfuric acid or aluminum oxide-iron oxide catalysts; and by the isomerization of N-alkyl anilines to the corresponding ar-alkyl aniline induced by heating the hydrochloride salt of the N-alkyl anilines. Ar-alkyl anilines are described by Dreisbach, U. S. 2,159,370, issued May 23, 1939, as being prepared by the ammonolysis of an alkylated halobenzene at 150 to 250° C. Acetanilide may be treated with an alkyl chloride in the presence of a catalyst and the resulting alkyl acetanilide deacetylated to prepare the para alkyl aniline as described by Herstein, U. S. 2,092,973, issued September 14, 1937.

I have now found that ar-alkyl anilines may be formed by the reaction of anilines and alkyl phenols between about 100 and 250° C. under superatmospheric pressure. The presence of a catalyst, such as zinc chloride, and a small amount of aniline hydrohalide materially enhances and promotes the reaction. Other metallic halide catalysts may also be employed, if desired.

The overall reaction and formation of the product may be illustrated by the following equation:

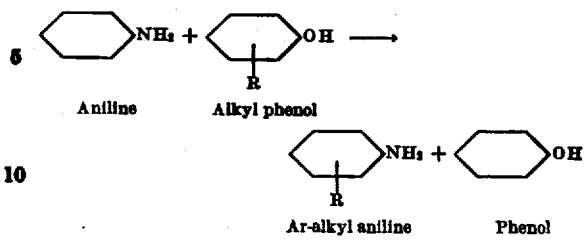

in which R represents an alkyl radical, which may, of course, be substituted in the aromatic ring at any of the three possible positions, namely ortho, meta, or para, but predominantly the latter. More extensively alkylated phenols may also be used, if desired, as well as the mono-alkylated phenol indicated. For purpose of convenience, the following discussion will be conducted in terms of the mono-alkylated phenols.

The exact nature of the reaction is not known but it may be assumed to be a double decomposition reaction with direct interchange of alkyl radicals and hydrogen atoms, since a number of compounds possible under a different consideration were not detected in the products of reaction. The presence of at least a small amount of diphenylamine formed by the elimination of ammonia between two aniline molecules in the acidic reaction might be expected but was not detected in the products. Also, the presence of alkyl diphenylamine which would be formed by splitting out of water between a molecule of aniline and a molecule of the alkyl phenol was not detected although it is reasonably expected when compared with a similar acidic reaction between beta naphthols and aniline as disclosed in Beilstein, vol 12, page 77, and with the product from reactions between phenol and substituted phenols with aniline as described in Beilstein, vol. 12, pp. 77 and 177. However, contrary to these expectations, the reaction of the aniline and alkyl phenols under the conditions of the present invention yields ar-alkyl anilines. In view of the literature on the rearrangement of the alkyl groups of N-alkyl anilines from the N- to the para or ortho positions on heating the hydrochloride of N-alkyl anilines, it might reasonably be expected that these compounds may be intermediate compounds in the preparation of ar-alkyl anilines by the present process. However, the presence of N-alkyl anilines was not detected in the products of present process. The absence of these possible impurities in the reaction products is particularly advantageous in the preparation of the desired ar-alkyl anilines. The tendency of the substitution predominantly in the para position is especially desirable in preparation of those compounds described above whose use prefer para substituted products.

The preferred conditions for the present reaction comprise a temperature of about 150 to 250° C., a superatmospheric pressure between about 500 and 2,000 pounds per square inch, and an acidic catalyst such as zinc chloride. The reaction mixture should be agitated thoroughly for a reaction time sufficient to produce a desired product. A reaction time of 5 to 15 hours may be required to obtain substantial yields of the desired product. The presence of a small amount of aniline hydrohalide materially enhances the efficiency of the reaction.

The advantages, desirability and usefulness of the present process in the preparation of ar-alkyl anilines are well illustrated by the following example.

Example 150 grams of o-tert-butylphenol, 24.8 grams of aniline hydrochloride, 93 grams of aniline and 20 grams of zinc chloride were introduced into a steel hydrogenation zone under a pressure 1,600 pounds per square inch of inert nitrogen gas. The reaction mixture was heated to 219° C. (425° F.) and agitated in the bomb by means of a rocker mechanism for a period of 8 hours after which the reaction products were separated. Products recovered include 89.1 grams of unreacted o-tert-butylphenol, 80 grams of unreacted aniline, 34.4 grams of phenol, 19.5 grams of p-tert-butylaniline, and 9.7 grams of an aniline black-type solid material.

At the completion of the run the charge was cooled, made acidic with 6 N hydrochloric acid and extracted thoroughly with ether to remove the phenols and non-basic material. The aqueous raffinate layer containing the amine hydrochlorides was made strongly basic with sodium hydroxide and again extracted with ether. The two ether extracts were separately stripped of ether and the residual materials fractionated on a 30-inch column packed with ⅛-inch glass helices. The acidic ether extract containing the phenols and non-basic material yielded the phenols, o-tert-butylphenol, and the solid material of the amount given above. The basic ether extract containing amines, anilines and other basic materials was fractionated under 100 mm. pressure and yielded ether, aniline, and a pot residue of about 25 grams which was recovered at 114° C. under reduced pressure. The latter substance boiled at atmospheric pressure without decomposition and was carefully fractionated in a Vigreux column at atmospheric pressure. Approximately 23 grams of this material distilled at 238.6±1° C. (461° F.), corrected. A sample ($N_D^{20}$ 1.5380) was analyzed on the basis of butylaniline.

Analysis: Calculated for butylaniline: C, 80.48%; H, 10.14%; N, 9.34%. Found: C, 80.4%; H, 10.3%; N, 9.5%.

Acetyl derivatives were prepared and the compound identified as o-tert-butylaniline from the melting point of the derivative.

No evidence of ortho, meta, or N-substituted tert-butylanilines was observed nor of isomerized tert-butylphenols, such as p- or m-tert-butylphenols, in the acidic extract from the product mixture. The yield of p-tert-butylaniline based on aniline in the reaction is 10.9 per cent and based on o-tert-butylphenol is 13 per cent.

In the absence of several different substituted products, it appears that para alkyl aniline (para amino alkylbenzene) is the most likely product of the present invention. This is particularly interesting in that a hydrogen of the nuclear attached $NH_2$-group is also quite active, but in the present case the product is para substituted alkyl aniline. The lack of N-substituted products may possibly be explained by the para-directing influence of the $NH_2$-group or for some other influence such as that which causes the alkyl radical in N-alkyl aniline to migrate to the para position upon isomerization. Absence in the reaction products of isomeric alkyl phenols other than the added reactant phenol may be explained by considering the reaction as a direct alkyl hydrogen transfer between the two reactant materials, namely aniline and the alkyl phenol, and by a strong para-directing influence of the amino group.

The present process is particularly useful in preparing ar-alkyl aniline having alkyl radicals containing up to as many as ten to twelve or more carbon atoms. In accordance with the general nature of most organic reactions, alkyl phenols having the higher molecular weight alkyl radicals, especially beginning with propyl, and having radicals of ramified, i. e., branched, structure, such as secondary and tertiary configurations, react more readily. The heavier molecular weight reactants may be dissolved in an inert hydrocarbon solvent to facilitate reaction and handling, if desired. Likewise the reactant alkyl phenol may comprise a mixture of isomeric alkyl phenols, such as often results in the preparation or recovery of alkylated phenols when ortho, meta and para substituted phenols may be present in varying proportions in the separated product.

The preceding discussion of the possible explanations of the mechanics of the reaction is not intended to limit in any way the scope of the invention and the example given is illustrative only and is not intended to limit the scope of the invention which is intended to cover all inherent novelty.

I claim:

1. A process for the alkylation of aniline to produce an alkylated aniline of the general formula

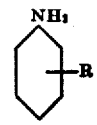

wherein R is an alkyl radical which comprises reacting said aniline with an alkyl phenol of the general formula

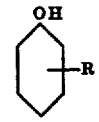

wherein R is an alkyl radical in the presence of zinc chloride at a temperature between about 100 and 250° C.

2. A process for the alkylation of aniline to produce an alkylated aniline of the general formula

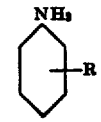

wherein R is an alkyl radical which comprises reacting said aniline with an alkyl phenol of the general formula

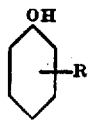

wherein R is an alkyl radical under superatmospheric pressures in the presence of zinc chloride and a small quantity of aniline hydrochloride.

3. A process for the preparation of a para alkyl aniline of the general formula

wherein R is an alkyl radical which comprises reacting aniline with an alkyl phenol of the general formula

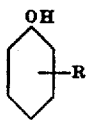

wherein R is an alkyl radical between about 100 and 250° C. under superatmospheric pressure in the presence of zinc chloride and aniline hydrohalide.

4. A process of alkylating aniline to produce an alkylated aniline of the general formula

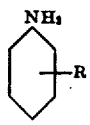

wherein R is an alkyl radical which comprises reacting said aniline in the presence of zinc chloride with an isomeric mixture of alkylated phenols of the general formula

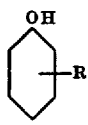

wherein R is an alkyl radical having from one to twelve carbon atoms.

5. A process for the preparation of alkyl anilines to produce an alkylated aniline of the general formula

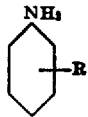

wherein R is an alkyl radical which comprises reacting aniline with an isomeric mixture of alkyl phenols of the general formula

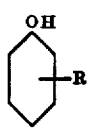

wherein R is an alkyl radical in the presence of a zinc chloride catalyst and aniline hydrohalide.

6. A process of alkylating aniline to produce an alkylated aniline of the general formula

wherein R is a branched-chain alkyl radical which comprises reacting said aniline in the presence of zinc chloride with an alkylated phenol of the general formula

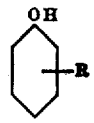

wherein R is a branched-chain alkyl radical.

7. A process for the preparation of alkylated aniline which comprises reacting aniline to produce an alkylated aniline of the general formula

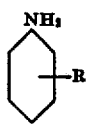

wherein R is a branched-chain alkyl radical having three to twelve carbon atoms under superatmospheric pressure in the presence of zinc chloride catalyst with a mixture of isomeric alkylated phenols of the general formula

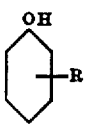

wherein R is a branched-chain alkyl radical having three to twelve carbon atoms.

8. A process for the preparation of alkylated aniline to produce a polyalkylated aniline of the general formula

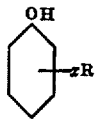

wherein R is an alkyl radical having three to twelve carbon atoms and $x$ is an integer greater than one which comprises reacting aniline under superatmospheric pressure in the presence of zinc chloride catalyst with a polyalkyl phenol of the general formula

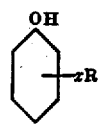

wherein R is an alkyl radical having three to twelve carbon atoms and $x$ is an integer greater than one.

9. A process for the preparation of alkylated aniline to produce an alkylated aniline of the general formula

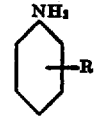

wherein R is an alkyl radical having three to twelve carbon atoms which comprises reacting aniline under superatmospheric pressure in the presence of zinc chloride catalyst with an alkyl phenol of the general formula

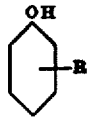

wherein R is an alkyl radical having three to twelve carbon atoms.

10. A process for the preparation of p-tert-butylaniline which comprises heating a mixture of aniline and o-tert-butylphenol at about 220° C. in the presence of zinc chloride and aniline hydrochloride for a period of about 8 hours under 1,600 pounds per square inch pressure.

JAMES H. BOYD.

REFERENCES CITED

The following references are of record in the file of this patent:

UNITED STATES PATENTS

| Number | Name | Date |
|---|---|---|
| 2,335,596 | Marschner | Nov. 30, 1943 |
| 2,403,748 | Olin | July 9, 1946 |
| 2,411,530 | Dreisbach et al. | Nov. 26, 1946 |

OTHER REFERENCES

Degering: "Organic Nitrogen Cpds." (University Lithoprinters, Ypsilanti, Mich., 1945), pages 298–299.

Degering: "An Outline of Organic Chemistry" (Barnes and Noble, Inc., N. Y., 4th Ed., 1941, reprinted 1946), page 380.